Aug. 28, 1934.  A. N. GOLDSMITH  1,971,446
HOME TALKING MOVIE COMBINATION
Filed Dec. 4, 1930

INVENTOR
ALFRED N. GOLDSMITH
BY
ATTORNEY

Patented Aug. 28, 1934

1,971,446

UNITED STATES PATENT OFFICE

1,971,446

HOME TALKING MOVIE COMBINATION

Alfred N. Goldsmith, New York, N. Y., assignor to Radio Corporation of America, a corporation of Delaware Application December 4, 1930, Serial No. 499,883

4 Claims. (Cl. 88—16.2)

The various apparatus necessary for the home making of talking moving pictures, as well as for the exhibiting of the sound movies thus produced, is rather complicated and expensive and quite beyond the means of the average prospective purchaser. Certain of the pieces of apparatus used in recording or in motion picture photography are substantially the same as corresponding equipment used in producing the records made, and it is the primary object of this invention to produce a combined home motion picture camera sound recorder, projector, and sound reproducer which shall fully utilize the similarities between the recording and reproducing equipment, and thus avoid the necessity of duplicating equipment.

A more specific object of this invention is to provide a simple, compact, and efficient combine camera and projector.

Another object of this invention is to provide a simple, compact, and effective combined sound recorder and reproducer.

A further object of this invention is to provide a motion picture camera and projector which may produce film, which may be used in back stage projection.

A still further object of this invention is to permit the elimination of all duplicate equipment in a combined home talking motion picture camera and projector.

These and further objects of the invention will become apparent from the following specification taken in connection with the appended drawing.

Attention is now invited to the drawing, in which.

Figures 1, 2:
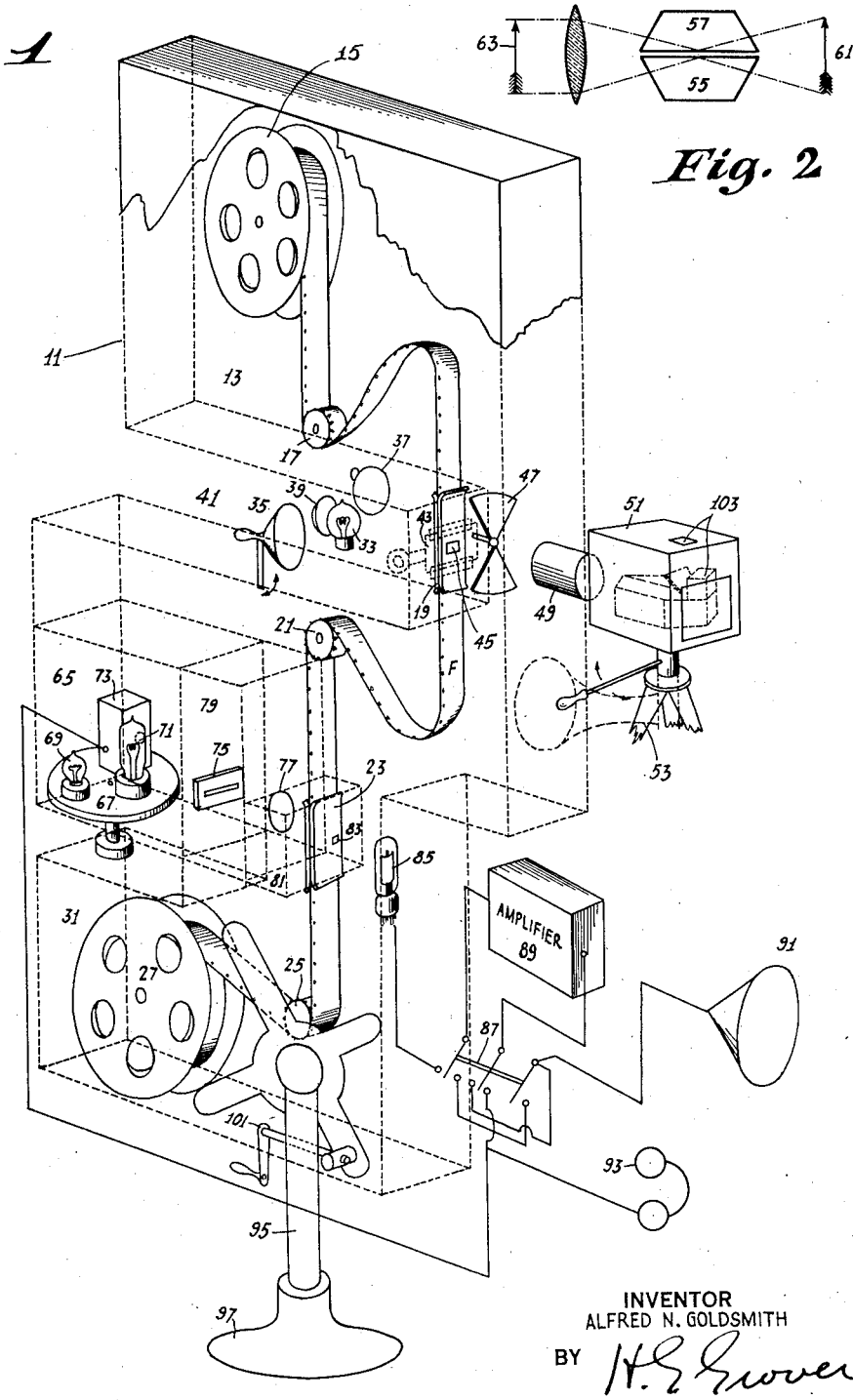
Fig. 1 is a schematic projection illustrating the essential elements constituting the combined camera, projector, sound recorder and reproducer constituting my invention.
Fig. 2 is a diagram illustrating the operation of the light reverser for use in connection with the production of films for back stage projection.

Attention is now particularly invited to Fig. 1, in which the frame of the combined talking motion picture camera projector, recorder, and reproducer, is in the form of a light-tight casing 11 including a compartment 13 adapted to house the film supply reel 15. The film from the supply reel 15 is pulled by means of the sprocket 17, and supplied to the picture gate and intermittent mechanism 19. After passing the film gate, the film passes over the continuous sprocket 21 and through the sound gate 23 through which it is pulled by the continuously rotating sprocket 25 and fed to the take-up reel 27 located in the take-up reel compartment 31.

The mechanism for actuating the various sprockets and reels shown, has not been illustrated as it is of the usual and well known type.

The light for projecting an image of the motion picture portion of the film during the projection thereof, is supplied by means of a light 33, the rays of which are concentrated by means of reflectors 35, 37 and 39, upon the film in the aperture of the picture gate. The reflectors 35 and 37 are pivotally mounted and may be swung to focus the light upon the subject when the equipment is being used as a camera recorder.

For the purpose of rendering the casing 11 light-tight when the instrument is being used for film pictures and recording of sound, a gate 43 is provided which prevents the light from source 33 or the day light from entering and fogging the film F as it passes through the machine. In front of the opening 45 of the picture gate is the usual flicker shutter 47 which is so arranged that it may be used for projecting or for taking pictures. The lens barrel 49 is provided with an appropriate type lens which may be used as a projection lens or as a camera lens.

Due to the fact that in a combined talking motion picture projector, it is necessary to make considerable alteration to permit the film being reversed due to the sound track being on one side thereof, it is desirable to provide some other means for reversing the image either in projection or in exposure. Further, in the 16 millimeter type of talking motion picture work, for instance, one row of sprocket holes has been eliminated, so it is impossible to reverse the film, and it is therefore necessary to provide some means for reversing the image either during exposure or during projection. To accomplish this, there is provided a reverser 51 mounted on a tripod 53 or removably mounted on a support secured to the casing 11, as indicated by the dotted lines.

The details of this reverser are schematically shown in Fig. 2 to which attention is now invited. It comprises two prisms 55 and 57 through which the light passes in the path indicated by the arrows. When mounted in the front of the projecting or camera lens 49 where the rays normally cross due to the lens, it serves to reverse the image of the arrow 61, as viewed at 63 so that if the film F is either exposed through the reverser 51, or the finished film is projected through the reverser 51, the image on the screen or upon the film respectively, will be reversed relative to what would be its normal position.

Mounted in a compartment 65 of the combined projector and camera is a turntable 67 upon which are mounted a light source 69 and a second light source 71, and a galvanometer 73. A handle extending outside compartment 65 permits turning the turntable. In recording, the table 67 is so turned that the light from source 69 is reflected in varying quantities by the galvanometer 73 upon the slot 75, and the image of the slot is focussed by means of lens 77 upon the moving film F in the sound gate 23. In order to prevent the light from fogging the film, the light-tight compartments 79 and 81 are disposed to confine the light as desired.

In sound reproducing the table 67 is turned so that the light from the source 71 falls upon the slot 75 and the image of the slot is focussed by lens 77 upon the moving film F in the aperture 83 of the gate 23. The light passing through the aperture 83 falls upon the photo cell 85. It is seen that the only light which is admitted to the compartment in which the photo cell 85 is disposed is that which passes through the aperture 83 and through a narrow linear portion of the film F, and thus the current induced in the photo-sensitive device 85 will vary in accordance with the recorded sound.

The current generated or modulated by the photo-sensitive device 85 is fed through the multiple switch 87 when in the left hand position to the amplifier 89, from which it passes again through the switch 87 and to the sound reproducing device 91. This sound reproducing device may be of any appropriate type, it being understood that when sounds impinge upon the device, a current will be generated by it. Thus when the switch 87 is in the right hand position, the device 91 is connected through the switch 87 to the input of the amplifier 89. The output of amplifier 89 is in this instance, impressed upon the monitoring device 94 which may be a pair of telephone receivers or any other desired sound reproducing equipment, and also upon the galvanometer 73 serving to actuate the latter, and thus vary the length of the exposure of the slot 75 and consequently the length of the image of said slot upon the moving film.

The casing 11 is pivotally mounted by means of the standard 95 pivoted in a heavy base 97. The standard 95 is pivotally connected to the casing 11 so that vertical adjustments may be made by means of the screw 101 as shown. Thus the entire equipment may be moved horizontally or vertically to train the image being projected upon the projection screen in reproduction, or focussing the camera upon the desired subject in filming. In either instance, with the reverser 51 mounted as shown by the dotted lines, its focus is not disturbed. For correctly aligning the reverser 51 with the subject in filming to produce a reversed film, a finder generally indicated at 103 is provided which will indicate the direction of focus of the reversing device.

Having thus described my invention, attention is invited to the fact that various modifications coming within its scope may be made, and I am therefore not to be limited by its specific form shown and described for the purpose of illustration only, but by the actual scope of my invention as set forth and determined in the appended claims.

I claim:

1. A combined camera, projector, sound recorder and sound reproducer which comprises a light-tight casing member, a picture gate, a sound gate, a film passing through each of said gates, a light source for illuminating said film, a combined projection and camera lens for focussing the image of said illuminated film in said picture gate upon the screen, or for focussing the image of the subject being filmed upon said film, a turntable mounted in said casing operable from the outside thereof, a galvanometer mounted upon said turntable, a light source mounted upon said turntable the light from which is adapted to be reflected by said galvanometer upon a slit to variably illumine it, means adapted to focus the image of said slit upon the moving film at the sound gate, and thus when sound recorded produce a variable area record, a second light source adapted to illuminate said slot in reproduction, and a photoelectric device adapted to be actuated by the light from said last mentioned light source passing through the film.

2. In a device of the type described, a sound recording optical system including an exciter lamp and a galvanometer adapted to cooperate with a soundtrack area of a motion picture film, a sound reproducing optical system including an exciter lamp adapted to cooperate with a corresponding soundtrack area at the same point, means adjustably supporting said exciter lamps and said galvanometer for bringing them selectively into cooperative relation with the said soundtrack area, and cinematographic apparatus adapted to cooperate with the same film and including means for enclosing the film when the recording optical system is used, means for illuminating the film when the reproducing optical system is used, a photoelectric cell arranged in cooperative relation to the said soundtrack position, an amplifier, and means for connecting the said amplifier selectively to either the said recording optical system or the said photoelectric cell according to which of said optical systems is in use.

3. In a device of the type described, a sound recording optical system including an exciter lamp and a galvanometer adapted to cooperate with a soundtrack area of a motion picture film, a sound reproducing optical system including an exciter lamp adapted to cooperate with a corresponding soundtrack area at the same point, means adjustably supporting said exciter lamps and said galvanometer for bringing them selectively into cooperative relation with the said soundtrack area, and cinematographic apparatus adapted to cooperate with the same film and including means for enclosing the film when the recording optical system is used, means for illuminating the film when the reproducing optical system is used, a photoelectric cell arranged in cooperative relation to the said soundtrack position, an amplifier, and means for connecting the said amplifier selectively to either the said recording optical system or the said photoelectric cell according to which of said optical systems is in use, telephonic transmitting means, telephonic reproducing means, and means for connecting the telephonic transmitting means to the input of the amplifier when the recording optical system is connected to the output thereof, and for connecting the telephonic reproducing means to the output of the amplifier when the photoelectric cell is connected to the input thereof.

4. In a device of the type described, a sound recording optical system including an exciter lamp and a galvanometer adapted to cooperate with a soundtrack area of a motion picture film, a sound reproducing optical system including an exciter lamp adapted to cooperate with a corresponding soundtrack area at the same point, means adjustably supporting said exciter lamps and said galvanometer for bringing them selectively into cooperative relation with the said soundtrack area, cinematographic apparatus adapted to cooperate with the same film and including means for enclosing the film when the recording optical system is used, means for illuminating the film when the reproducing optical system is used; a photoelectric cell arranged in cooperative relation to the said soundtrack position, an amplifier, and means for connecting the said amplifier selectively to either the said recording optical system or the said photoelectric cell according to which of said optical systems is in use, telephonic transmitting means, telephonic reproducing means, and means for connecting the telephonic transmitting means to the amplifier when the recording optical system is also connected thereto, and for connecting the telephonic reproducing means to the amplifier when the photoelectric cell is also connected thereto.

ALFRED N. GOLDSMITH.